US012249306B2

(12) United States Patent
Ae et al.

(10) Patent No.: US 12,249,306 B2
(45) Date of Patent: Mar. 11, 2025

(54) MUSICAL SOUND PROCESSING DEVICE AND MUSICAL SOUND PROCESSING METHOD

(71) Applicant: Roland Corporation, Shizuoka (JP)

(72) Inventors: Takahiro Ae, Shizuoka (JP); Hiromu Nagasawa, Shizuoka (JP)

(73) Assignee: Roland Corporation, Shizuoka (JP)

( * ) Notice: Subject to any disclaimer, the term of this patent is extended or adjusted under 35 U.S.C. 154(b) by 669 days.

(21) Appl. No.: 17/614,366

(22) PCT Filed: May 31, 2019

(86) PCT No.: PCT/JP2019/021889

§ 371 (c)(1),
(2) Date: Nov. 25, 2021

(87) PCT Pub. No.: WO2020/240874

PCT Pub. Date: Dec. 3, 2020

(65) Prior Publication Data

US 2022/0246120 A1 Aug. 4, 2022

(51) Int. Cl.

*G10H 1/00* (2006.01)
*G10H 1/24* (2006.01)
*G10H 7/02* (2006.01)

(52) U.S. Cl.

CPC ............. *G10H 1/0008* (2013.01); *G10H 1/24* (2013.01); *G10H 7/02* (2013.01); *G10H 2220/265* (2013.01)

(58) Field of Classification Search

CPC .......... G10H 1/0008; G10H 1/24; G10H 7/02; G10H 2220/265

(Continued)

(56) References Cited

U.S. PATENT DOCUMENTS 5,824,933 A * 10/1998 Gabriel ................ G10H 1/0008 84/649
6,255,576 B1 * 7/2001 Suzuki ..................... G10H 7/02 84/625

(Continued)

FOREIGN PATENT DOCUMENTS

EP 2239727 10/2010
EP 2495720 9/2012

(Continued)

OTHER PUBLICATIONS

"International Search Report (Form PCT/ISA/210) of PCT/JP2019/021889," mailed on Aug. 20, 2019, with English translation thereof, pp. 1-2.

(Continued)

*Primary Examiner* — Christina M Schreiber
(74) *Attorney, Agent, or Firm* — JCIPRNET

(57) ABSTRACT

This musical sound processing device includes: a storage part that stores musical sound waveform data; a plurality of reproduction control parts that perform reproduction processes for reproducing a plurality of pieces of musical sound piece data acquired by dividing the musical sound waveform data stored in the storage part on the basis of respectively independent reproduction start timing, reproduction end timing and reproduction modes; and a mixer that mixes a plurality of reproduction sounds to be outputted as the results of the reproduction processes.

20 Claims, 11 Drawing Sheets

(58) Field of Classification Search
USPC ..................................................... 84/604
See application file for complete search history.

(56) References Cited

U.S. PATENT DOCUMENTS

| | | | | |
|---|---|---|---|---|
| 7,094,965 | B2 * | 8/2006 | Kitayama | G10H 1/42 84/626 |
| 2001/0017076 | A1 * | 8/2001 | Fujita | G10H 7/02 84/603 |
| 2004/0200336 | A1 * | 10/2004 | Senoo | G10H 7/002 |
| 2006/0000345 | A1 * | 1/2006 | Yoshikawa | G10H 1/0041 84/616 |
| 2006/0219090 | A1 * | 10/2006 | Komano | G10H 1/24 84/622 |
| 2009/0095145 | A1 * | 4/2009 | Streich | G06F 16/683 84/609 |
| 2013/0340593 | A1 * | 12/2013 | Uemura | G10H 7/00 84/604 |
| 2013/0340594 | A1 * | 12/2013 | Uemura | G10H 7/02 84/605 |
| 2014/0270181 | A1 * | 9/2014 | Siciliano | G11B 27/105 381/17 |
| 2015/0154979 | A1 * | 6/2015 | Uemura | G10H 1/00 704/503 |
| 2015/0310843 | A1 * | 10/2015 | Setoguchi | G10H 1/42 84/603 |
| 2017/0061945 | A1 * | 3/2017 | Okazaki | G10H 1/047 |
| 2017/0372711 | A1 * | 12/2017 | Shirahama | G10H 1/08 |
| 2018/0240447 | A1 * | 8/2018 | Baker | G10H 1/42 |
| 2019/0295517 | A1 * | 9/2019 | Sato | G10H 1/24 |
| 2019/0339930 | A1 * | 11/2019 | Kaiwa | G06F 3/165 |
| 2020/0202827 | A1 * | 6/2020 | Kanada | G10H 1/18 |
| 2022/0044662 | A1 * | 2/2022 | Tachibana | G10H 7/02 |
| 2022/0084490 | A1 * | 3/2022 | Mamori | G10H 1/0008 |
| 2022/0246120 | A1 * | 8/2022 | Ae | G10H 1/26 |

FOREIGN PATENT DOCUMENTS

| | | | | | |
|---|---|---|---|---|---|
| EP | 2495720 | A1 * | 9/2012 | G10H 1/0025 |
| JP | H07325580 | A * | 12/1995 | |
| JP | H11327557 | | 11/1999 | |
| JP | 2001265332 | | 9/2001 | |
| JP | 2001265332 | A * | 9/2001 | G10H 1/0025 |
| JP | 2002169551 | A * | 6/2002 | |
| JP | 2005165357 | | 6/2005 | |

OTHER PUBLICATIONS

"Search Report of Europe Counterpart Application", issued on Nov. 18, 2022, pp. 1-8.
"Office Action of Europe Counterpart Application", issued on Nov. 26, 2024, p. 1-p. 4.

* cited by examiner

| pad number | reproduction mode |
|---|---|
| #0 | reproduction mode #0 (reproduction speed/pitch) |
| #1 | reproduction mode #1 (reverse reproduction) |
| #2 | reproduction mode #2 (retrigger) |
| #3 | reproduction mode #3 (hold) |
| ⋮ | ⋮ |
| #15 | |

FIG. 7

MUSICAL SOUND PROCESSING DEVICE AND MUSICAL SOUND PROCESSING METHOD

CROSS-REFERENCE TO RELATED APPLICATION

This application is a 371 application of the International PCT application serial no. PCT/JP2019/021889, filed on May 31, 2019. The entirety of the above-mentioned patent application is hereby incorporated by reference herein and made a part of this specification.

TECHNICAL FIELD

The present invention relates a musical sound processing device and a musical sound processing method.

RELATED ART

In the related art, as a musical sound processing device that generates new musical sound pattern data from pre-generated musical sound pattern data, there is a device that divides musical sound pattern data having a predetermined length into a plurality of pieces of musical sound piece data and sequentially changes the reproduction order of the plurality of pieces of musical sound piece data (for example, see Patent Literatures 1 and 2).

CITATION LIST

Patent Literature

[Patent Literature 1]
Japanese Patent Laid-Open No. 2001-265332
[Patent Literature 2]
Japanese Patent Laid-Open No. 2005-165357

SUMMARY

Technical Problem

In sequential reproduction in the related art, for each piece of the musical sound piece data, reproduction related to certain musical sound piece data is finished and then reproduction related to next musical sound piece data is performed. Therefore, it is not possible to generate musical sound material in which reproduction sounds of the plurality of pieces of musical sound piece data are superimposed.

The present invention is to provide a technology capable of increasing the number of types of musical sound material that can be generated.

Solution to Problem

An aspect of the present invention is a musical sound processing device including a storage part that stores musical sound waveform data, a plurality of reproduction control parts that performs reproduction processes for reproducing a plurality of pieces of musical sound piece data acquired by dividing the musical sound waveform data stored in the storage part, based on respectively independent reproduction start timing, reproduction end timing, and reproduction modes, and a mixer that mixes a plurality of reproduction sounds which are output from the plurality of reproduction control parts as results of the reproduction processes.

Another aspect of the present invention is a musical sound processing method including storing musical sound waveform data, performing reproduction processes for reproducing a plurality of pieces of musical sound piece data acquired by dividing the musical sound waveform data, based on respectively independent reproduction start timing, reproduction end timing, and reproduction modes, and mixing a plurality of reproduction sounds to be output as results of the reproduction processes.

BRIEF DESCRIPTION OF DRAWINGS

FIG. 7 shows an example of a connection between pad numbers and reproduction modes.

Figure 9:
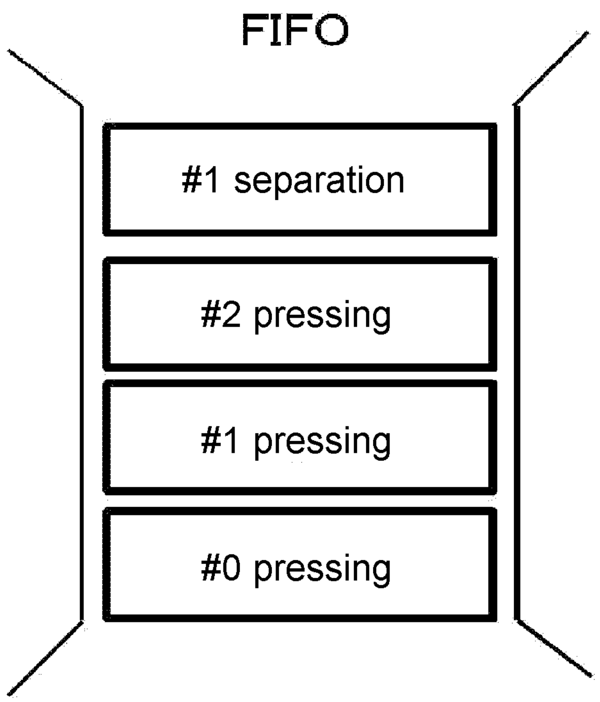
Figure 9:
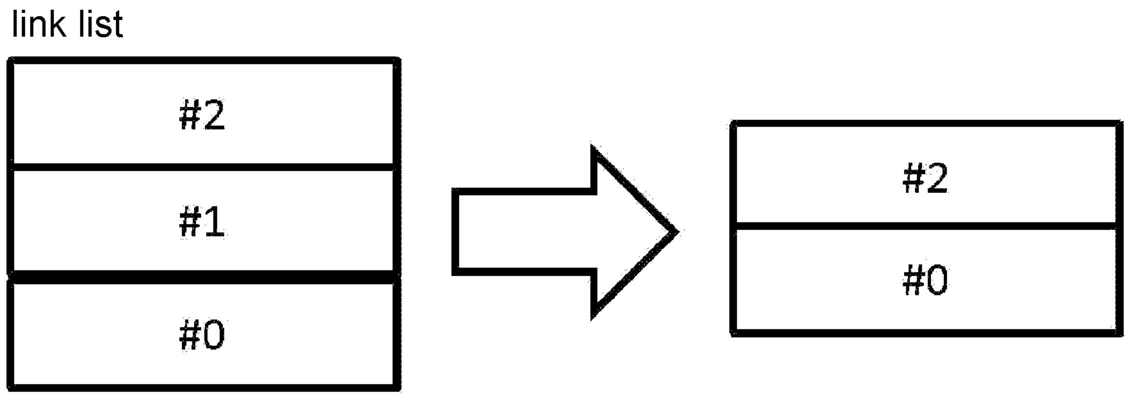

(A) of FIG. 9 shows a FIFO that stores pad event information and (B) of FIG. 9 shows a link list of pads corresponding to a pad event.

Figure 10:
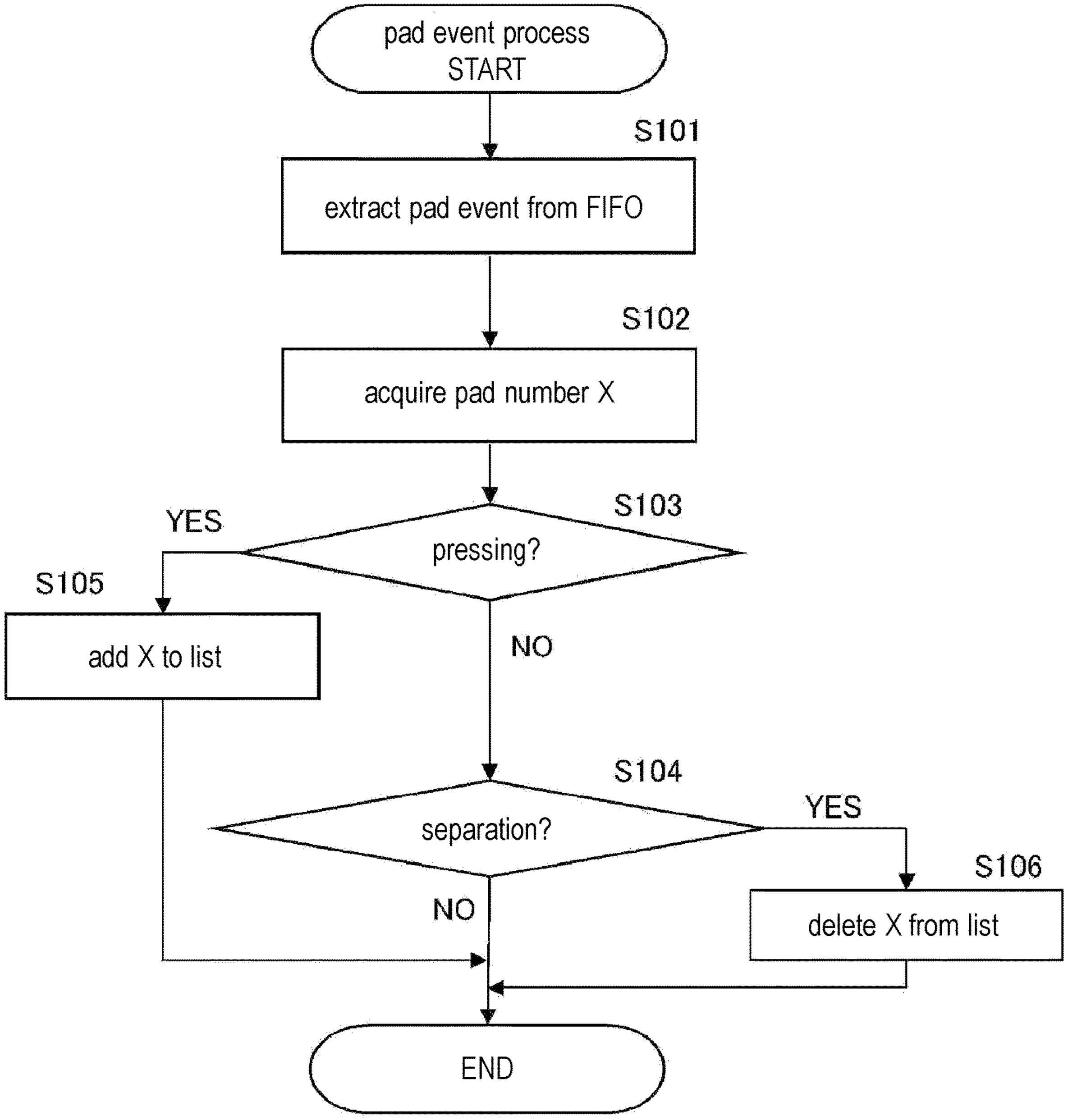

FIG. 10 is a flowchart showing an example of a pad event process.

Figure 11:
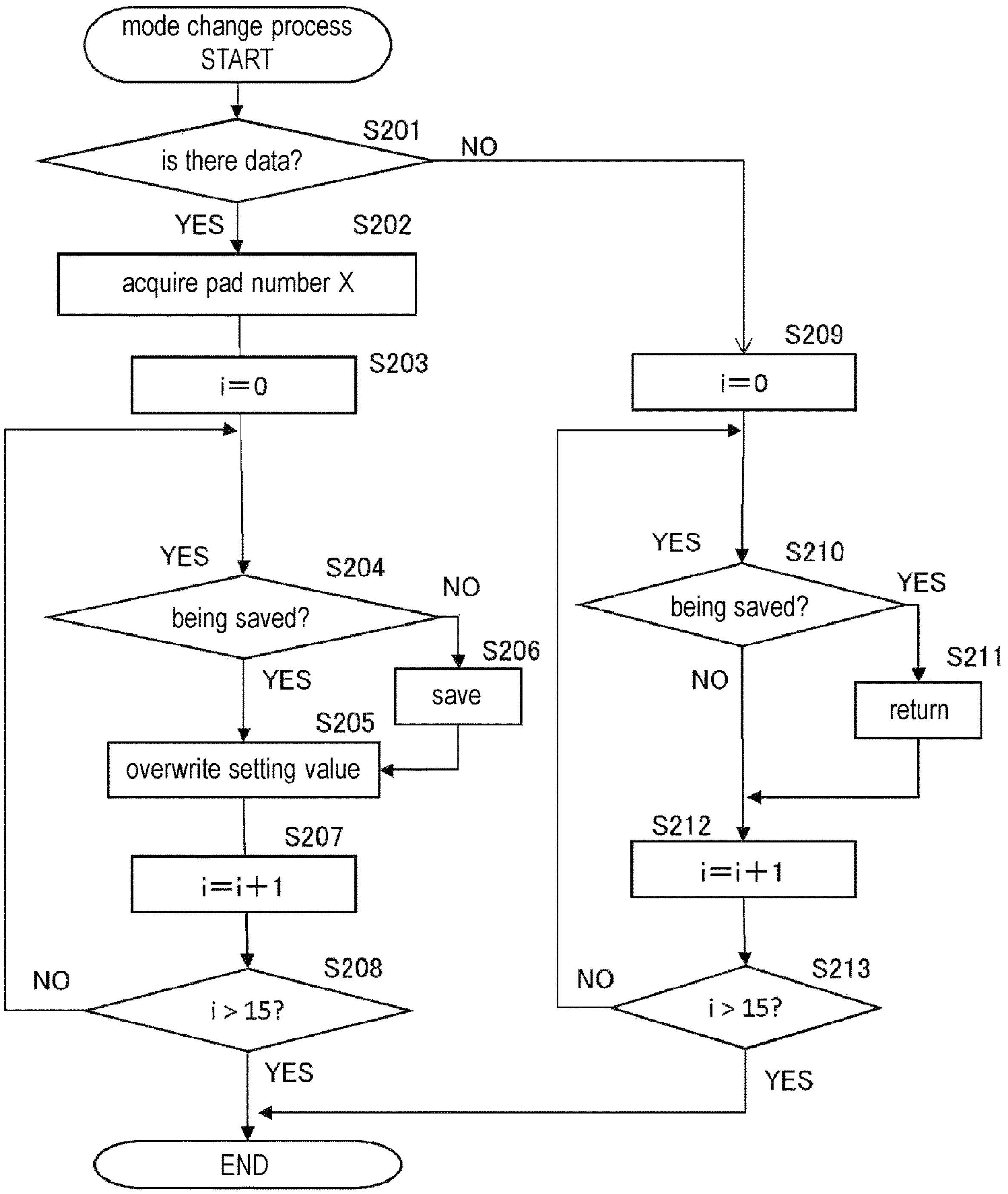

FIG. 11 is a flowchart showing an example of a reproduction mode change process based on a link list.

DESCRIPTION OF EMBODIMENTS

A musical sound processing device according to an embodiment has the following configuration.

(1) A storage part that stores musical sound waveform data (2) A plurality of reproduction control parts that performs reproduction processes for reproducing a plurality of pieces of musical sound piece data acquired by dividing the musical sound waveform data stored in the storage part based on respectively independent reproduction start timing, reproduction end timing, and reproduction modes.

(3) A mixer that mixes a plurality of reproduction sounds to be output from the reproduction control parts as the results of the reproduction processes.

For example, the mixer outputs musical sound data in which reproduction sounds output in parallel from two or more of the plurality of reproduction control parts are superimposed. According to the musical sound processing device, the reproduction processes are performed on the plurality of pieces of musical sound piece data based on the respectively independent reproduction start and end timings. Therefore, by performing the reproduction processes in parallel on two or more pieces of musical sound piece data, it is possible to acquire musical sound data in which reproduction sounds acquired as the results of the reproduction processes are superimposed. That is, it is possible to generate musical sound material in which the reproduction sounds of the plurality of pieces of musical sound piece data are superimposed. Thus, according to the musical sound processing device and the musical sound processing method, it is possible to increase the number of types of musical sound material that can be generated.

The musical sound processing device may adopt a configuration in which the plurality of reproduction control parts is formed by integrated circuits capable of performing the respectively independent reproduction processes on the plurality of pieces of musical sound piece data. The integrated circuit is, for example, LSI, DSP, FPGA, AISC, SoC, and the like. The reproduction processes are performed using the integrated device, so that it is possible to reduce a processing load due to a reproduction process performed by a processor such as a CPU.

The musical sound processing device may adopt a configuration in which the reproduction mode includes at least one of selection of a musical sound piece, a change in a reproduction speed, reverse reproduction, repetitive reproduction, and a combination thereof with respect to the musical sound piece data. However, the reproduction is not limited to the above enumeration.

Each of the plurality of reproduction control parts may change a reproduction speed based on a predetermined coefficient by which a reproduction speed of the musical sound waveform data is to be multiplied. Furthermore, each of the reproduction control parts may perform reverse reproduction based on information indicating a reproduction direction. Furthermore, each of the reproduction control parts may perform repetitive reproduction based on information indicating a position where reproduction of the musical sound piece data is looped and information indicating the reproduction end timing.

The musical sound processing device may further include a plurality of first operating elements to which the plurality of pieces of musical sound piece data is assigned, respectively, a plurality of second operating elements to which a plurality of reproduction modes is assigned, respectively, and a setting part that assigns musical sound piece data, which is selected by an operation of the plurality of first operating elements, to at least one of the plurality of reproduction control parts, and sets a reproduction mode selected by an operation of the plurality of second operating elements. One piece of musical sound piece data may be assigned to one first operating element or two or more first operating elements.

There are no restrictions on a method of assigning the plurality of pieces of musical sound piece data to the plurality of first operating elements and the arrangement of the plurality of first operating elements. However, the first operating elements may include a plurality of buttons that is arranged in series and to which the plurality of pieces of musical sound piece data is respectively assigned in order in the musical sound waveform data. By so doing, it is possible to intuitively understand the number and arrangement of the musical sound piece data. Furthermore, the second operating elements may be a plurality of pads used for outputting musical instrument sounds. However, the second operating elements may be buttons or keys.

The musical sound processing device may further include a mode control part that changes a reproduction mode of the plurality of reproduction control parts to a reproduction mode, which is assigned to a first pad of a plurality of pads, while the first pad is pressed during the reproduction of at least one of the plurality of pieces of musical sound piece data. By so doing, it is possible to change a reproduction mode by operating the first pad during the reproduction of reproduction sounds.

The musical sound processing device may adopt a configuration in which the mode control part saves information of an original reproduction mode when changing to the reproduction mode assigned to the first pad with respect to the plurality of reproduction control parts and performs a process for re-setting information of the original reproduction mode when the pressed state of the first pad is released. The reproduction mode is temporarily changed in response to an operation (for example, pressing) of the first pad, and when the operation (for example, pressing) of the first pad is released, the reproduction mode is returned to the original reproduction mode, so that it is possible to avoid the complexity of re-setting.

Hereinafter, a musical sound processing device and a musical sound processing method according to an embodiment will be described with reference to the drawings. The configuration of the embodiment is an example. The configuration of the embodiment is not limited.

<Configuration of Musical Sound Processing Device>

Figure 1:
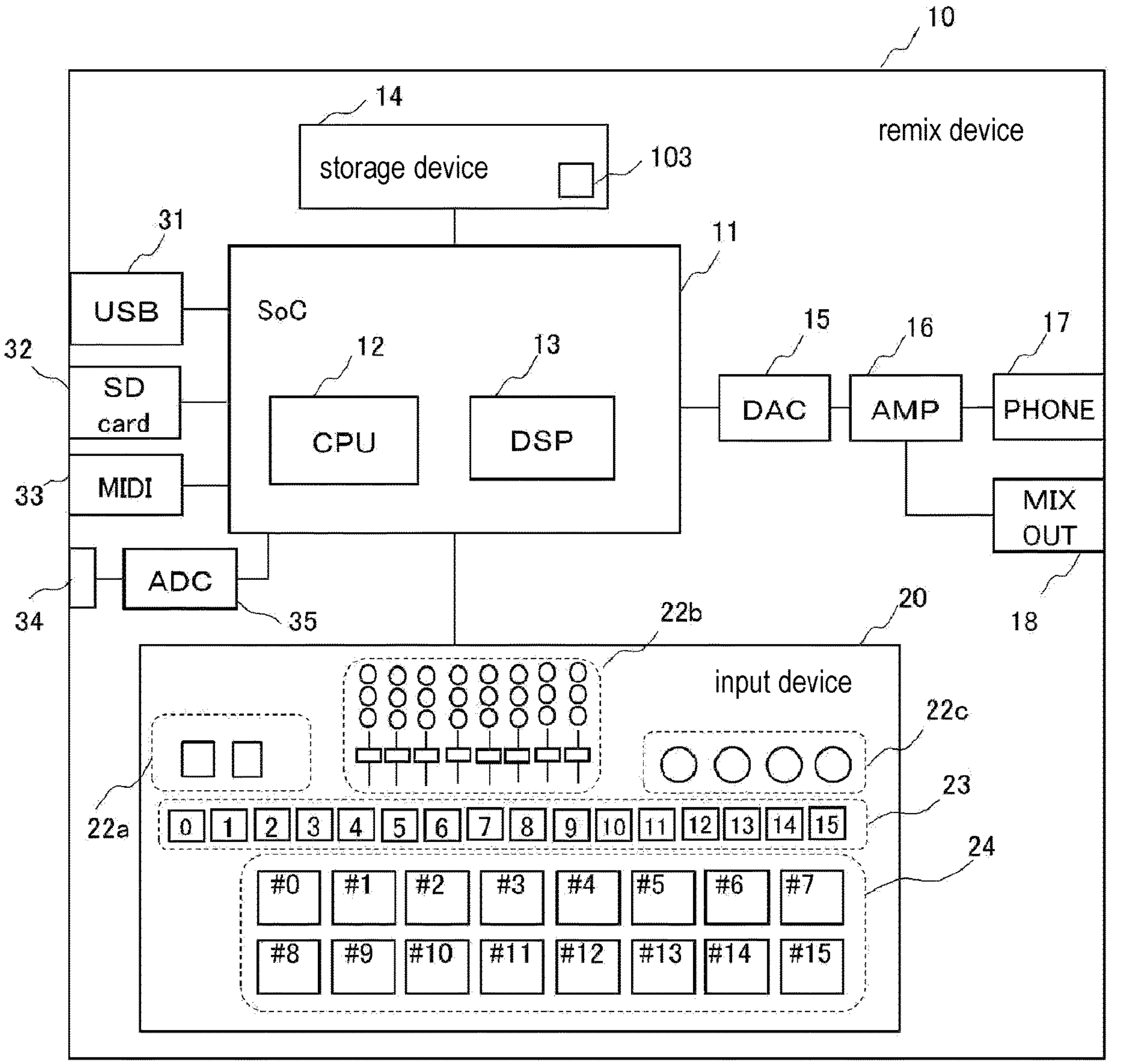
FIG. 1 shows a configuration example of a musical sound processing device.

FIG. 1 shows a configuration example of a musical sound processing device. A musical sound processing device 10 includes a system on chip (SoC) 11 and a storage device 14 connected to the SoC 11. A universal serial bus (USB) connector 31, an SD card slot 32, and a connection terminal 33 for a musical instrument digital interface (MIDI) device are connected to the SoC 11. The storage device 14 is an example of a storage part.

The musical sound processing device 10 (SoC 11) is connected to a personal computer (PC) via the USB connector 31 and exchanges USB MIDI and USB audio. The musical sound processing device 10 can also display various setting information applied to the musical sound processing device 10, by using a display included in the PC.

Furthermore, the SoC 11 reads and writes data such as musical sound data to and from an SD card connected to the SD card slot 32. Furthermore, the SoC 11 can exchange MIDI data with the MIDI device connected via the connection terminal 33. Furthermore, the SoC 11 also has an input terminal 34 for a musical sound signal from an electronic musical instrument. The input terminal 34 is connected to an analog-to-digital converter (ADC) 35 and a digitized musical sound signal is input to the SoC 11.

The SoC 11 is an integrated circuit that operates as a central processing unit (CPU) 12, a digital signal processor (DSP) 13, and the like. The storage device 14 includes a read only memory (ROM), which stores programs to be executed by the CPU 12 and the DSP 13, a synchronous dynamic access memory (SDRAM), which is used as a working area of the CPU 12, an SDRAM, which is used in an effect process in the DSP 13, and the like.

Each DSP 13 performs signal processing on a signal (musical sound signal) of musical sound data input to the SoC 11, such as musical sound data (audio data) read from the SD card and musical sound data input from the electronic musical instrument such as the MIDI device. By executing the programs, the CPU 12 performs control of exchange with a device (PC and display) connected via the USB connector 31, exchange with the SD card, and exchange with the MIDI device, control of the DSP 13, exchange with an input device 20, and the like.

A digital-to-analog converter (DAC) 15 is connected to the SoC 11, and an amplifier (AMP) 16 is connected to the DAC 15. The AMP 16 is connected to a terminal (PHONE) 17 for a headphone and a terminal (MIXOUT) 18 for a speaker. The musical sound signal subjected to the signal processing by the DSP 13 is converted into an analog signal by the DAC 15, is amplified by the AMP 16, and is connected to the headphone via the terminal 17 or the speaker via the terminal 18. With this, musical sounds corresponding to the musical sound signal are output from the headphone or the speaker.

The musical sound processing device 10 has the input device (input panel) 20. The input device 20 has operating elements 22*a*, 22*b*, and 22*c* for setting various parameters related to the musical sound processing device 10. The operating elements 22*a* to 22*c* are a plurality of buttons, switches, sliders, knobs, dial knobs, and the like. The operating elements 22*a* to 22*c* are used to define musical sound waveform data and musical sound piece data used for generating a glitcher effect, and to set and input parameters corresponding to a reproduction method (reproduction mode) of the musical sound piece data, which will be described below.

Furthermore, the input device 20 has a button group 23 including a predetermined number (16 in FIG. 1) of buttons (buttons #0 to #15) for inputting a reproduction order (called a step) of the musical sound piece data. Moreover, the input device 20 has a pad group 24 for a playing as an example of a playing element. The pad group 24 includes a predetermined number (16 in FIG. 1) of pads (pads #0 to #15), and when each of the pads is pressed, musical instrument sounds (piano sound and drum sound) assigned to the pads are reproduced and output. The plurality of pads can be used as a selection button for a reproduction mode (parameter set for performing reproduction according to the reproduction mode) applicable to the musical sound piece data.

<Generation of Glitcher Effect>

In the present embodiment, the musical sound processing device 10 records one phrase of a musical sound signal acquired by reading from the SD card or from playing, and treats the musical sound signal corresponding to one phrase as musical sound waveform data to be divided. The data length of the musical sound waveform data varies depending on a phrase definition and the number of phrases. By dividing the musical sound waveform data in accordance with a predetermined number of divisions, a plurality of (for example, a predetermined number of two or more) pieces of musical sound piece data is acquired. By performing reproduction processes on each piece of the musical sound piece data based on respectively independent (individual) reproduction start timing, reproduction end timing, and reproduction modes (reproduction methods), a new musical sound (playing) is generated.

The new musical sound includes an effect called a glitcher. A glitcher is an abnormal sound or noise generated in a sudden failure, and is also called a scatter. The glitcher is basically acquired by a very short repeat reproduction of musical sound material. Furthermore, the glitcher also has a pseudo effect due to a short delay, but is usually generated by buffer reproduction. The glitcher also includes a combination of other effects such as reverse reproduction and pitch changes. Furthermore, the glitcher can generally construct a sequence.

In the related art, the glitcher is generated by switching a reproduction mode of one system reproduction device on a time axis (in other words, dividing one musical sound on the time axis and changing a reproduction mode for each musical sound piece). In contrast, in the musical sound processing device 10, the SoC 11 has a plurality of independent players (reproduction systems) and each player acquires a musical sound that can be used as the glitcher by performing an autonomous reproduction operation in accordance with preset setting parameters (setting information).

Figure 2:
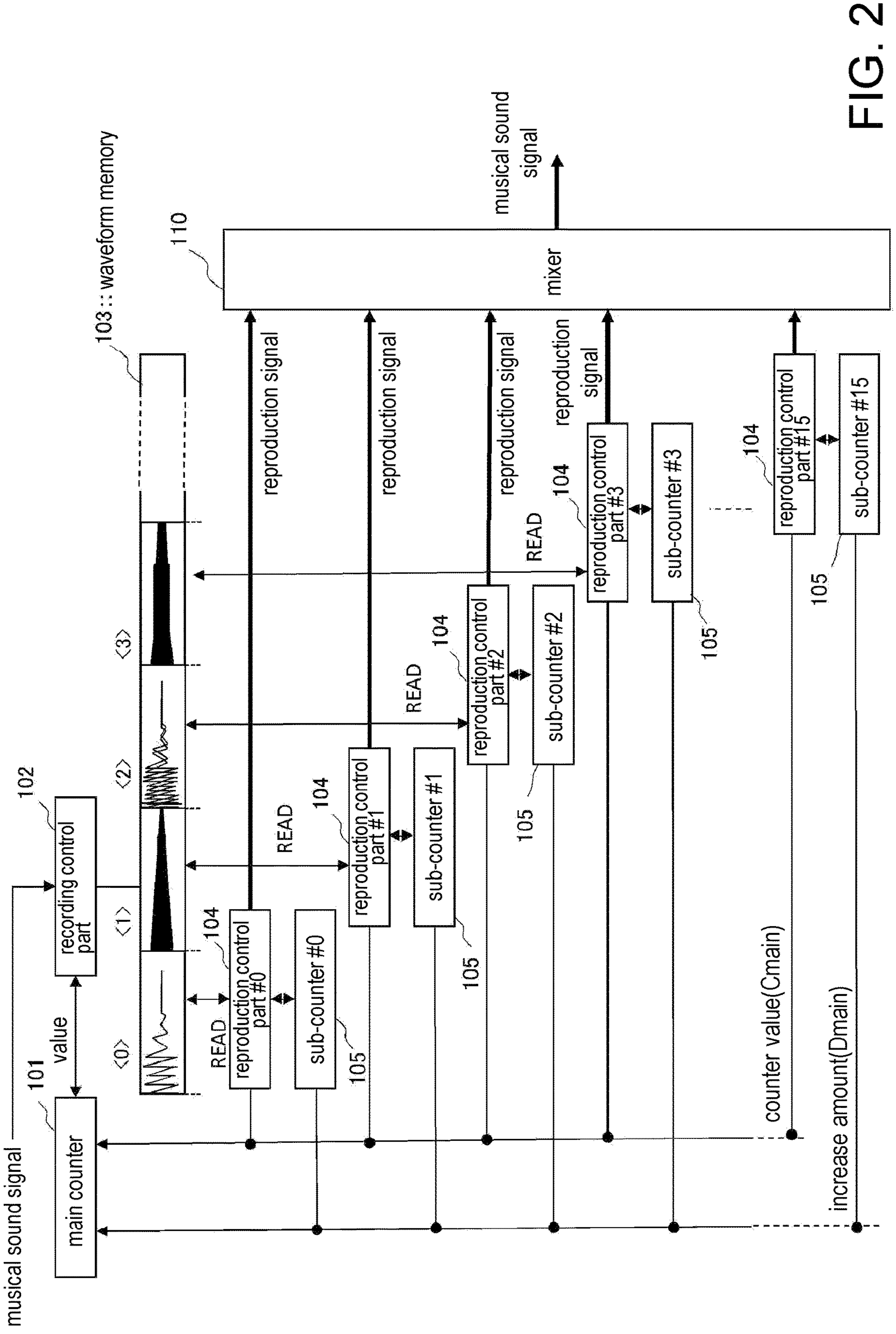
FIG. 2 schematically shows a configuration of processing of a DSP included in a SoC.

FIG. 2 schematically shows a configuration of the processing of the DSP 13 included in the SoC 11. The DSP 13 operates as a device including a main counter 101, a recording control part (also referred to as a recorder) 102, a plurality of reproduction control parts (also referred to as players) 104 forming a plurality of reproduction systems, and a mixer 110. Each of the reproduction control parts 104 has a sub-counter 105. Furthermore, a predetermined storage area of the SDRAM included in the storage device 14 is used as a waveform memory 103.

Even though a plurality of DSPs 13 may operate as the plurality of reproduction control parts 104 (a plurality of reproduction systems), one DSP 13 may operate as the plurality of reproduction control parts 104 (the plurality of reproduction systems). Furthermore, regardless of the type of an integrated circuit operating as the reproduction control part 104, a field programmable gate array (FPGA) and a combination of a DSP and an FPGA, an application specific integrated circuit (ASIC), and the like can be applied instead of the DSP 13.

The musical sound signal is, for example, a waveform signal of the musical sound read from the SD card, or a waveform signal of playing (musical sound) input from the terminal 34 and converted into a digital format by the ADC 35.

The main counter 101 generates timings related to recording by the recording control part 102 and reproduction of the reproduction control part 104. A maximum value of the main counter 101 is determined by a phrase length. The length of one phrase is determined by a musical time, a beat per minute (BPM), and the number of bars, which are extracted from preset or the musical sound signal.

During recording and reproduction, the value of the main counter 101 (main counter value) is incremented by 1 for each sampling time corresponding to a sampling frequency of the musical sound signal. The main counter value is associated with an address of the waveform memory 103. The main counter value is incremented for each sampling time based on the sampling frequency of the musical sound signal, and an address value of the waveform memory 103 is incremented by one address for each sample. The value of the main counter 101 is returned to 0 when exceeding the maximum value, and is incremented again.

For example, when a four-four time, BPM 120, and 1 bar are defined as 1 phrase, a sampling frequency Fs is 44.1 kHz (2 seconds (88,200 samples)) and the range of the main counter value is “0” to “88,199”.

When recording is stopped (when only reproduction is performed out of recording and reproduction), the maximum value of the main counter value set at the time of recording is retained. The main counter value is returned to 0 when exceeding the maximum value, and is incremented again, as in the case of the recording and reproduction. The trigger timing and the reproduction speed of the reproduction control part 104 are controlled by an increase range of the main counter value.

The recording control part 102 stores (records) the musical sound signal in the waveform memory 103 in accordance with the main counter value. During the recording and reproduction, the recording control part 102 refers to the main counter value, and stores the musical sound signal (sample data) in the address of the waveform memory 103 corresponding to the main counter value. A head portion of the musical sound signal may be faded in and a termination portion thereof may be faded out.

As described above, the main counter value is returned to 0 again when reaching the maximum value. With this, the recording control part 102 repeatedly overwrites the musical sound signal in the range of an address corresponding to the range (0 to maximum value) of possible values of the main counter value during recording. When the recording is stopped, the recording control part 102 does not write the musical sound signal to the waveform memory 103. With this, the musical sound signal stored in the waveform memory 103 is maintained.

In the waveform memory 103, a musical sound signal of one phrase is stored as musical sound waveform data. In relation to the musical sound waveform data, an address when the musical sound waveform data is treated as a plurality of pieces of musical sound piece data is calculated in accordance with the number of divisions set at appropriate timings. An address of each of the plurality of pieces of musical sound piece data is set in each of the plurality of reproduction control parts 104 that performs reproduction processes on the musical sound piece data. The musical sound piece data (waveform data) acquired by dividing the musical sound waveform data is called a "grain".

The musical sound processing device 10 has i reproduction systems (reproduction control parts 104) so that reproductions for i grains are independently performed in parallel. Each of the grains acquired by the division is assigned to any one of the reproduction control parts 104. For example, the reproduction control parts 104 and the grains are numbered, and each of the grains is assigned to the reproduction control part 104 as a reproduction target in ascending order of numbers. The assignment is done by a set of addresses as described above.

In the present embodiment, as an example, a maximum value of the number i of divisions (the number of grains) is 16 (i is 0, 1, 2, . . . , 14, 15) and 16 (#0 to #15) reproduction control parts 104 corresponding to the maximum value are provided. However, the number of divisions can be appropriately set in a range smaller than the maximum value of 16. The maximum value of the number of divisions may be a number of 2 or more and a number other than 16. The number of divisions is set by a user in accordance with the musical time of the musical sound to be played and a time width to which the glitcher effect is desired to be applied.

Each of the reproduction control parts 104 performs a reproduction process of the musical sound signal stored in the waveform memory 103 with reference to the main counter value and the value of the sub-counter 105 (sub-counter value). The reproduction control part 104 determines a reproduction start timing and a reproduction end timing with reference to the main counter value.

Information (parameters) indicating the reproduction start timing and the reproduction end timing is set in advance in the reproduction control parts 104. The reproduction start timing and the reproduction end timing can be set independently of each other in each of the reproduction control parts 104. With this, two or more reproduction control parts 104 can perform reproduction processes in parallel.

The reproduction control part 104 starts a counting operation of the sub-counter 105 at the reproduction start timing, and calculates a reproduction position (reading position of samples forming a grain) from the waveform memory 103 based on a preset reproduction start address and the value of the sub-counter. The reproduction control part 104 reads samples from the calculated address and reproduces the read samples. The reproduction signal is input to the mixer 110.

As described above, different grains are assigned to the plurality of reproduction control parts 104. Therefore, the reproduction start address is different between the reproduction control parts 104. As the reproduction start address, a start or end address of a grain corresponding to the reproduction control part 104 in the waveform memory 103 is set. Of course, the same grain may be given.

The sub-counter 105 counts up the value (count value) of the sub-counter 105 in accordance with a preset increase amount (change width). As the increase amount (change width) of the value of the sub-counter 105, a value obtained by multiplying the preset increase amount by an increase amount of the main counter 101 may be applied. By the multiplication, the increase amount of the sub-counter 105 can be made larger or smaller than the increase amount of the main counter 101. When the increase amount of the sub-counter 105 per unit time is larger than the increase amount of the main counter 101, it means that a reproduction speed (pitch) is increased, and when the increase amount of the sub-counter 105 is smaller than the increase amount of the main counter 101, it means that the reproduction speed is decreased.

The operation of each of the reproduction control parts 104 is individually performed based on the reproduction start and reproduction end timings in a parameter set preset for each of the reproduction control parts 104. That is, the plurality of reproduction control parts 104 performs reproduction processes in parallel in accordance with timings set therein. Furthermore, by making the reproduction start address different between the reproduction control parts 104, the plurality of reproduction control parts 104 can perform reproduction processes in parallel on a plurality of grains. With this, an arbitrary grain can be superimposed and reproduced at an arbitrary timing and by an arbitrary reproduction method.

The mixer 110 outputs a musical sound (musical sound data), in which the reproduction signals output from the reproduction control parts 104 are superimposed, by a mixing process. Furthermore, it is also possible to add an effect to a reproduction sound in accordance with preset information. The effect includes, for example, reverb, chorus, delay, compressor, equalizer, and the like.

<Reproduction Process>

FIG. 2 shows an example in which one phrase of the musical sound signal is stored in the waveform memory 103. An example of one phrase is an alternating repetition of a drum kick and snare, which corresponds to four quarter notes. One phrase can be divided into 16 at maximum, but in the present example, one phrase is divided into four grains.

As an example, grain numbers <0> to <3> are assigned to respective grains in order on the time axis, and are assigned to the reproduction control parts 104 in ascending order of the grain numbers. Specifically, the grain <0> is assigned to the reproduction control part #0, the grain <1> is assigned to the reproduction control part #1, the grain <2> is assigned to the reproduction control part #2, the grain <3> is assigned to the reproduction control part #3. The reproduction control parts #4 to #15 are not used. Each of the reproduction control parts #0 to #3 performs a reproduction process at an individual timing in accordance with a parameter set of a reproduction method (reproduction mode) set therein.

Figure 3:
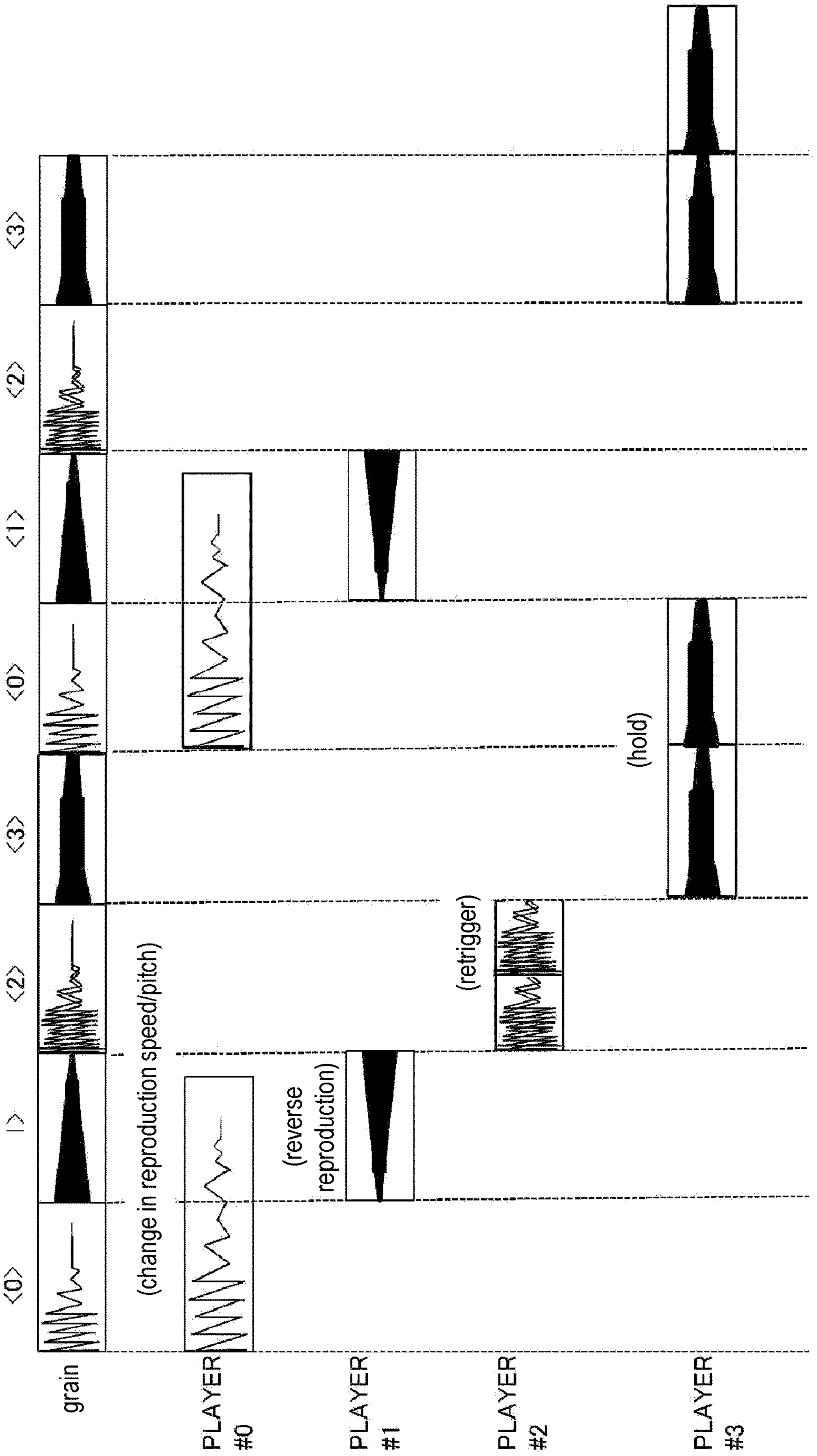
FIG. 3 shows an example of musical sound piece data (grains) stored in a waveform memory and reproduction sounds output from respective reproduction control parts.

FIG. 3 shows an example of the grains <0> to <3> stored in the waveform memory 103 and reproduction sounds output from the reproduction control parts #0 to #3 (players #0 to #3). It is assumed that the same phrase (grains <0> to <3>) is reproduced twice without a break as musical sound pattern data.

FIG. 3 shows an example in which the reproduction control part #0 reproduces the grain <0> at a reproduction speed lower than an original speed by a reproduction process. With this, the reproduction pitch of the grain <0> is lowered, the reproduction end timing is later than the original reproduction end timing of the grain <0>, and a kick with a feeling of being extended lower than the original kick is reproduced.

Furthermore, FIG. 3 shows an example in which the reproduction control part #1 reversely reproduces the grain <1> between the original reproduction start and end timings of the grain <1> by a reproduction process. Furthermore, FIG. 3 shows an example in which the reproduction control part #2 repeats the first half portion of the grain <2> twice (called a retrigger) between the original reproduction start and end timings of the grain <2>. Furthermore, FIG. 3 shows an example in which the reproduction control part #3 reproduces the grain <3> at the reproduction and end timing of the grain <3> and repeats the reproduction of the grain <3> at the reproduction and end timing of the next grain <0> (called a hold).

Since the reproduction control parts #0 to #3 individually perform reproduction processes, the reproduction processes of the reproduction control parts #0 and #1 or the reproduction processes of the reproduction control parts #3 and #0 are performed in parallel. As a consequence, the signals of the reproduction sounds output from the plurality of reproduction control parts 104 are superimposed by the mixer 110, and various glitcher effects can overlap. In this way, according to the musical sound processing device 10, it is possible to acquire a reproduction sound not acquired only by switching a reproduction method of musical sound pieces in the related art.

In the related art, for the purpose of generating the glitcher effect, the change of the reproduction order of musical sound pieces and the switching of the reproduction method are performed by a single CPU. In contrast, the musical sound processing device 10 according to an embodiment performs reproduction processes by parallel processing of a plurality of reproduction systems using the DSP 13. With this, it is possible to acquire musical sound material in which reproduction sounds of grains to which the glitcher effect is added are superimposed, and it is possible to increase the type of the musical sound material. On the other hand, the CPU 12 performs processing related to the setting of a parameter set to a plurality of reproduction systems implemented using the DSP 13, and does not become a main body of the reproduction process. Therefore, it is also possible to reduce the load of the CPU 12.

<Reproduction Process Example>

Figure 4:
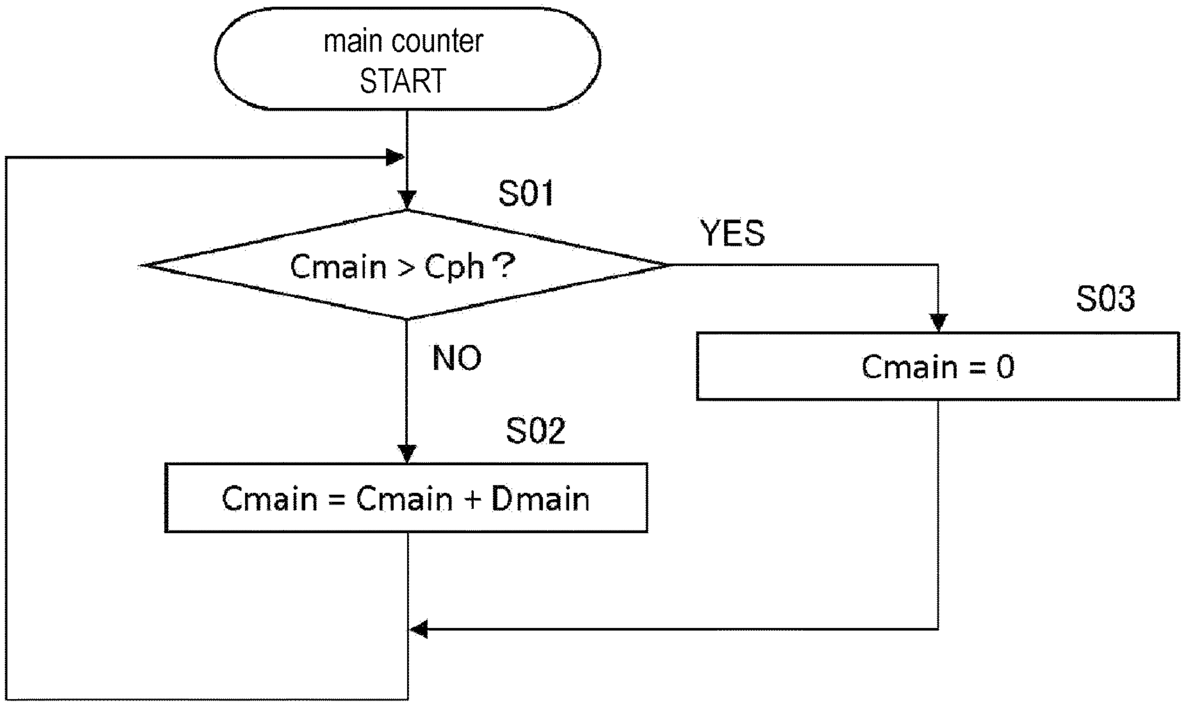
FIG. 4 is a flowchart showing a processing example of a main counter in a DSP.

Details of the reproduction process will be described. FIG. 4 is a flowchart showing a processing example of the main counter 101 by the DSP 13. In S01, the DSP 13 determines whether a main counter value Cmain, which is the count value of the main counter 101, is larger than an end value Cph indicating the length of a phrase stored in the waveform memory 103.

When it is determined that Cmain is equal to or less than Cph (NO in S01), it means that the end timing of the phrase is not reached. Therefore, the DSP 13 sets a value, which is obtained by adding a change width (increase amount) of the main counter 101 to the current value of Cmain, to a new value of Cmain (S02). Thereafter, the DSP 13 returns to the process of S01. In contrast, when the value of Cmain is larger than Cph, the DSP 13 returns the value of Cmain to 0 (S03), and returns to the process of S01. By so doing, the value of the main counter 101 is controlled.

Figure 5:
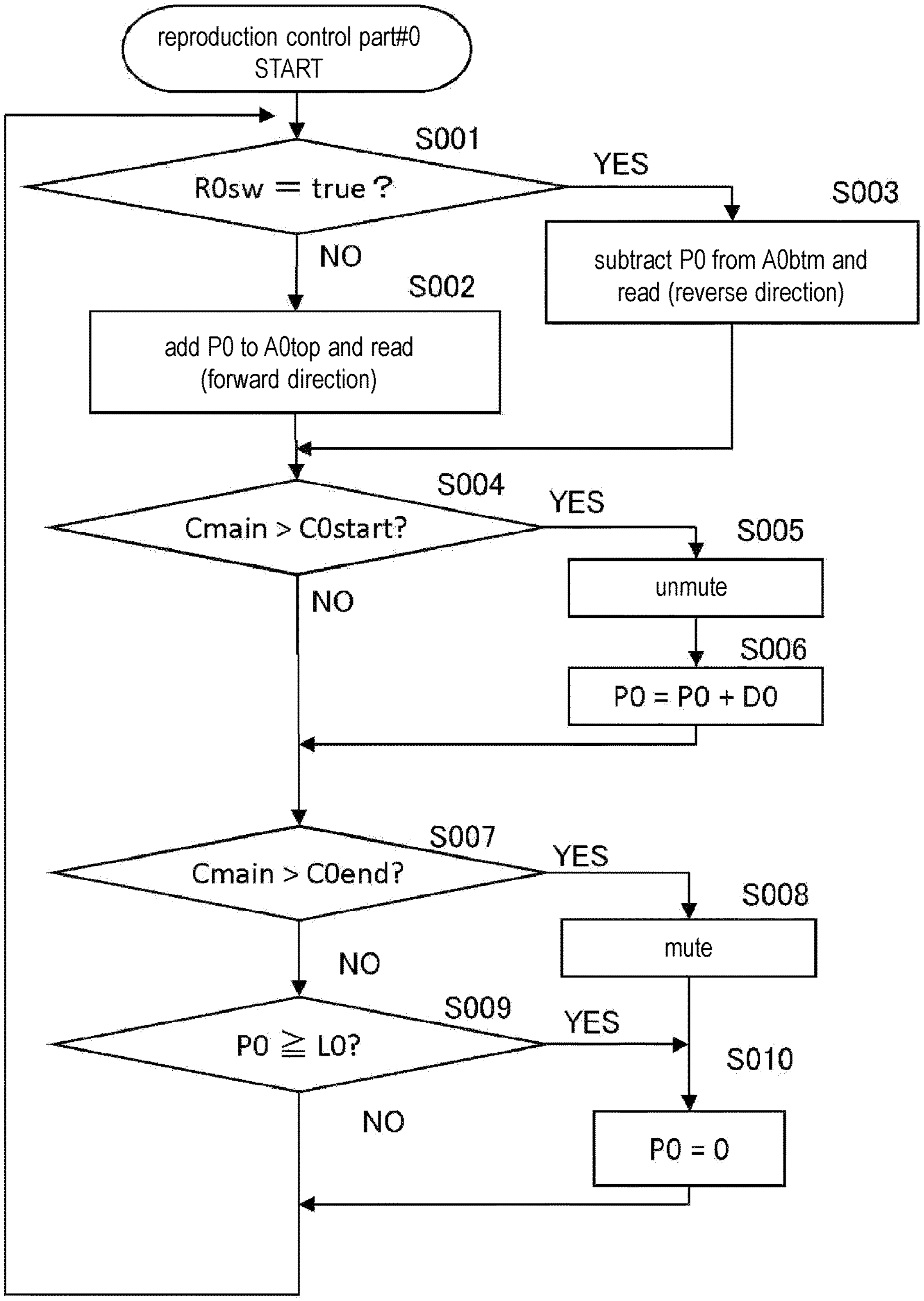
FIG. 5 is a flowchart showing a processing example of a reproduction control part.

FIG. 5 is a flowchart showing a processing example of the reproduction control part 104. Since the reproduction control parts #0 to #15 can perform the same operation, FIG. 5 shows the process of the reproduction control part #0. However, parameter values referred to by the reproduction control parts 104 are different for the respective reproduction control parts 104.

In S001, the reproduction control part #0 determines whether a value of R0sw is "true". The value of R0sw indicates on (true)/off (false) of a reverse reproduction switch of a grain. When it is determined that the value of R0sw is "true", the reproduction control part #0 proceeds to a process of S003 and if not, the reproduction control part #0 proceeds to a process of S002.

In S002, the reproduction control part #0 adds a value of P0 to a value of A0top and reads a part (sample) of a grain stored in an address corresponding to the value, thereby performing a reproduction process. A0top indicates a start address of the grain in the waveform memory 103. The process of S002 means forward reproduction.

In S003, the reproduction control part #0 subtracts the value of P0 from a value of A0btm and reads a grain (sample) stored in an address corresponding to the value, thereby performing a reproduction process. The A0btm indicates a termination (end) address of the grain in the waveform memory 103. Consequently, the process of S003 means a reproduction process in a reverse direction (reverse reproduction). After the end of S002 and S003, the reproduction control part #0 proceeds to a process of S004.

In S004, the reproduction control part #0 determines whether a value of Cmain is equal to or larger than a value of C0start. C0start indicates a reproduction start counter value of a sub-counter #0 corresponding to the reproduction control part #0. When the value of Cmain is larger than C0start, it means that the main counter value has reached the reproduction start timing of a grain that is a reproduction target of the reproduction control part #0. When it is determined that the value of Cmain is larger than C0start, the reproduction control part #0 proceeds to a process of S005, and if not, the reproduction control part #0 proceeds to a process of S007.

In S005, the reproduction control part #0 cancels the mute so that the reproduction sound of A0top can be output. Subsequently, the reproduction control part #0 changes the value of P0 to a value obtained by adding a value of D0 to a current value of P0 (S006), and proceeds to a process of S007. P0 indicates a position of a reproduction reading pointer (reading address from the waveform memory 103). D0 indicates a reading position change width (amount of change in the sub-counter 105 (sub-counter #0) of the reproduction control part #0).

When D0 does not interact with the change width Dmain of the value of the main counter 101 (in the case of non-interaction), a value equal to a predetermined reading position change width d0 is used as the value of D0 (D0=d0). In contrast, when D0 interacts with Dmain, d0 is used as a coefficient of Dmain and a value obtained by multiplying Dmain by d0 is used as D0 (D0=Dmain*d0). In such a case, a grain reproduction speed is a speed obtained by multiplying the reproduction speed of the main counter by the coefficient d0. For example, when all the sub-counters 105 are interlocked with the main counter 101, all the sub-counters 105 can be controlled by the change width of the main counter 101. Regardless of interlocking/non-interlocking, when D0 is set to a value larger than 1, the reproduction speed is faster than the original speed, and when D0 is set to a value smaller than 1, the reproduction speed is slower than the original speed. When D0 is 1, the reproduction speed remains the same as the original speed.

In S007, the reproduction control part #0 determines whether the value of Cmain is equal to or larger than a value of C0end. C0end indicates a reproduction end counter value of the sub-counter #0. When the value of Cmain is larger than C0end, it means that the main counter value has reached the reproduction end timing of the grain that is the reproduction target of the reproduction control part #0. When it is determined that the value of Cmain is larger than C0end, the reproduction control part #0 proceeds to a process of S008, and if not, the reproduction control part #0 proceeds to a process of S009.

In S008, the reproduction control part #0 sets the mute and proceeds to a process of S010. In S010, the reproduction control part #0 sets the value of P0 to 0 (S010) and returns to the process of S001.

In S009, the reproduction control part #0 determines whether the value of P0 is equal to or larger than a value of L0. The value of L0 indicates a loop length, and for example, a value equal to or less than a grain length is set. For example, the loop length is set to 1/n times the original grain length, and the number of loops (repetitions) in one grain length is n times.

When P0 is equal to or larger than L0, it means that the reading position has reached a loop position. Therefore, when it is determined that the value of P0 is equal to or larger than the value of L0, the reproduction control part #0 sets the value of P0 to 0 (S010) and returns to the process of S001.

By the control of the reproduction control part #0 as described above, processing according to a preset reproduction mode is performed. By the mute and unmute processes, reproduction sounds are output from the reproduction start timing to the reproduction end timing. The mute process may be performed by a component other than the reproduction control part 104.

In FIG. 3, the reproduction process (change in reproduction speed) performed by the reproduction control part #0 can be performed by presetting D0 to a value smaller than 1 and setting C0end to a timing later than the original reproduction end timing with respect to the process of FIG. 5. The reproduction process (reverse reproduction of grains) performed by the reproduction control part #1 can be performed by presetting R1sw to “true”. The reproduction process (retrigger) performed by the reproduction control part #2 can be performed by setting a loop length L2 to ½ of the grain length. The reproduction process (hold) performed by the reproduction control part #3 can be performed by setting L3 to a length the same as the grain length and setting a value of a reproduction end counter value C3end to a value twice the grain length. The retrigger and the hold are examples of repetitive reproduction.

<Setting of Reproduction Mode>

The change in the reproduction start and end timings, the change in the reproduction speed and pitch, the reverse reproduction, the retrigger, the hold, and the like as described above are performed by the following procedure.

(1) Definition of phrases and grains (setting information: phrase length (musical time, BPM, and number of bars), number of divisions, and the like) is registered in the musical sound processing device 10.

(2) Grain is selected, a reproduction method (reproduction mode) for each grain is determined, and a parameter group based on the reproduction mode is set for each of the main counter 101, the reproduction control part 104, and the sub-counter 105. The parameter group includes at least a plurality of types of parameters described with respect to the processes of FIG. 4 and FIG. 5.

The above operations (1) and (2) are performed by a user (operator) of the musical sound processing device 10 who manually operates a plurality of predetermined operating elements (buttons, switches, sliders, knobs, and the like) included in the input device 20 and sets the parameter group described in the description of the phrases and grains and the description regarding the processes of FIG. 4 and FIG. 5.

However, the above operation (2) is complicated because the number of parameters is large and the complexity thereof increases when the number of grains (the number of divisions) increases. Therefore, the musical sound processing device 10 has a configuration of generating a step sequence with respect to the phrases stored in the waveform memory 103.

<Generation of Step Sequence>

The musical sound processing device 10 can generate (make) a step sequence with respect to a plurality of grains acquired by division. Each of steps forming the step sequence is performed by determining grains to be reproduced and a reproduction mode of the grains.

For example, in a state in which musical sound data of one phrase is stored in the waveform memory 103, when the number of divisions of the phrase is input using the input device 20, the CPU 12 assigns each of the grains to the 16 buttons (buttons #0 to #15) forming the button group 23.

The assignment is made in ascending order of the grain numbers and in ascending order of the button numbers. When the maximum number of grains is 16, the grains are assigned to all the 16 buttons forming the button group 23 and there are no unused buttons. In contrast, when the number of grains is smaller than the number of buttons, there are unused buttons.

Furthermore, each grain is assigned to the reproduction control part 104 in ascending order of the grain numbers. For example, when the number of divisions is 16, the grains <0> to <15> are assigned to all the reproduction control part #0 to #15, respectively. However, as in the example shown in FIG. 2, when the number of divisions of one phrase is 4, the grains <0> to <3> are assigned to the reproduction control part #0 to #3 in ascending order of numbers, and the reproduction control part #4 to #15 are not used.

The reproduction order of the grains forming the step can be set using the button group 23. When a certain step is generated, a button, to which a grain to be reproduced in the step is assigned is pressed among the buttons to which the grains are assigned.

The buttons #0 to #15 forming the button group 23 are arranged side by side in a row in the left-right direction (arranged in series) and the button numbers are set in ascending order of numbers from the left. Then, the grains are assigned in ascending order of the numbers. Therefore, the user or the operator of the musical sound processing device 10 can intuitively understand that a plurality of grains is registered on a plurality of buttons in a left-aligned form. That is, the operator can understand that the leftmost button is a button with the grain <0>, the next is a button with the grain <1>, the next is a button with the grain <2>, and the like. The buttons #0 to #15 are examples of a plurality of buttons.

When the number of grains is less than the number of buttons, for example, when the number of grains is 4, it is intuitively understood that the fifth to sixteenth buttons from the left are not used. When the operator desires to reproduce an $i^{th}$ grain, the operator has only to press an $i^{th}$ button from the left. By pressing a button, a grain to be reproduced (and the reproduction control part 104 that performs reproduction) is determined. The plurality of buttons forming the button group 23 is an example of a plurality of first operating elements.

Moreover, the operator can press a pad, to which a desired reproduction mode is assigned, among the 16 pads #0 to #15 forming the pad group 24, thereby selecting the reproduction mode for a selected grain. When the pad is pressed, a parameter set related to the reproduction mode assigned to the pad is set in the reproduction control part 104 selected by pressing a button. The plurality of pads forming the pad group 24 is an example of a plurality of second operating elements.

With this, a grain to be reproduced and a reproduction mode of the grain for a certain step are determined. Thereafter, for each of the following and subsequent steps, the selection of a grain to be reproduced and a reproduction mode of the grain is repeated using the button group 23 and the pad group 24 described above. With this, for example, the CPU 12 as a setting part can assign a grain to the reproduction control part 104 by using the button group 23 and assign a reproduction mode to the reproduction control part 104 by using the pad group 24, which can easily generate and store a step sequence having a desired number of steps for a plurality of grains. However, a component other than the CPU 12 may operate as the setting part.

Figure 6:
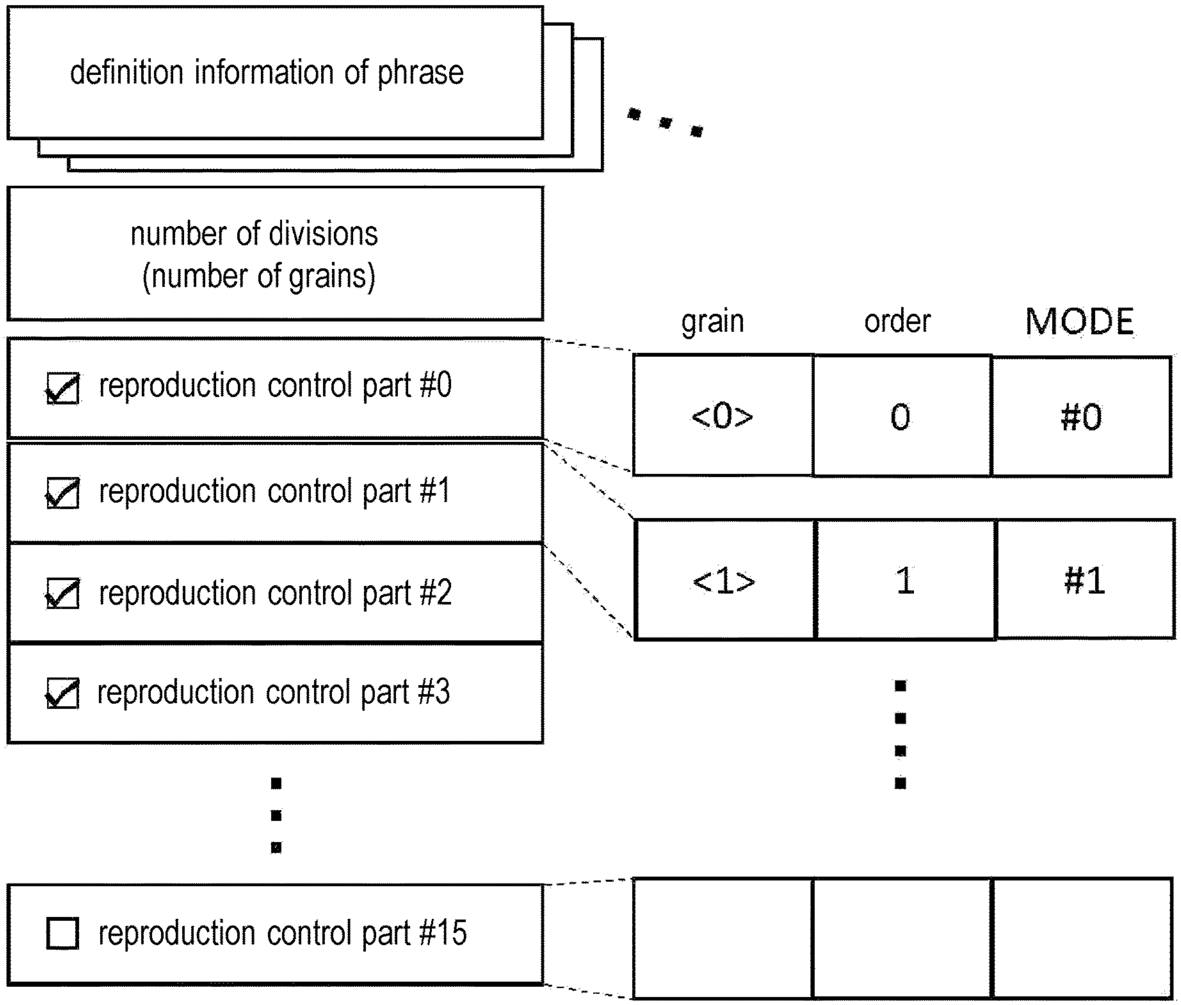
FIG. 6 shows an example of a data structure of a reference parameter group of a DSP.

FIG. 6 and FIG. 7 show a data structure example of a reference parameter group of the DSP 13, which is stored in the SDRAM of the storage device 14. The data structure example is an example and other configurations may be adopted. Reading and writing of information and data to the SDRAM are performed by, for example, the CPU 12, but may be performed by a component other than the CPU 12.

In FIG. 6, the SDRAM stores definition information of a phrase (musical time, BPM, number of bars, sampling frequency, number of samples, and address) stored in the waveform memory 103, and definition (setting value) of the number of divisions (number of grains) of the phrase.

Moreover, the SDRAM stores the parameter group (Cmain, Cph, and Dmain) of the main counter 101, which is calculated based on the definition of the phrase. Furthermore, the SDRAM may store definition information of a plurality of phrases.

Furthermore, the SDRAM is provided with an area for storing information on each of the reproduction control parts 104 (#0 to #15). The information storage area stores a flag indicating whether the reproduction control part #i is in use or not used (use and non-use are shown according to whether a check box in the drawing is checked), a parameter set (Pi, Di (di), Cistart, Ciend, Li, Risw, Aitop, and Aibtm), information indicating grains to be reproduced (grain number), information indicating a reproduction order of the grains, and information indicating a reproduction mode for the grains.

As shown in FIG. 7, the SDRAM stores pad numbers of the pads forming the pad group 24 and a corresponding table indicating reproduction modes assigned to the pads. The reproduction mode is, for example, a change in a reproduction speed/pitch, reverse reproduction, retrigger, hold, a combination of two or more of these, and the like, which are described with reference to FIG. 3. The reproduction mode includes a parameter set corresponding to a reproduction method. Grain numbers may be added to the parameter set.

For example, in generating a step sequence, when the grain <0> is reproduced in the first reproduction order by the reproduction mode #0 (reproduction mode/pitch), the operator presses the button #0 of the button group 23 and the pad #0 of the pad group 24. In response to such an operation, the CPU 12 performs the following processing.

That is, the CPU 12 transmits parameters related to the grain number #0 and the reproduction mode #0 to the reproduction control part #0 of the DSP 13. Furthermore, the DSP 13 sets the start and end addresses of the grain <0>, which are acquired from the transmitted parameters, as A0top and A0btm. Furthermore, the DSP 13 calculates the value of Cmain when the grain <0> is reproduced in the first reproduction order, sets the calculated value as C0start, calculates an offset position from C0start, and determines C0end.

Figure 8:
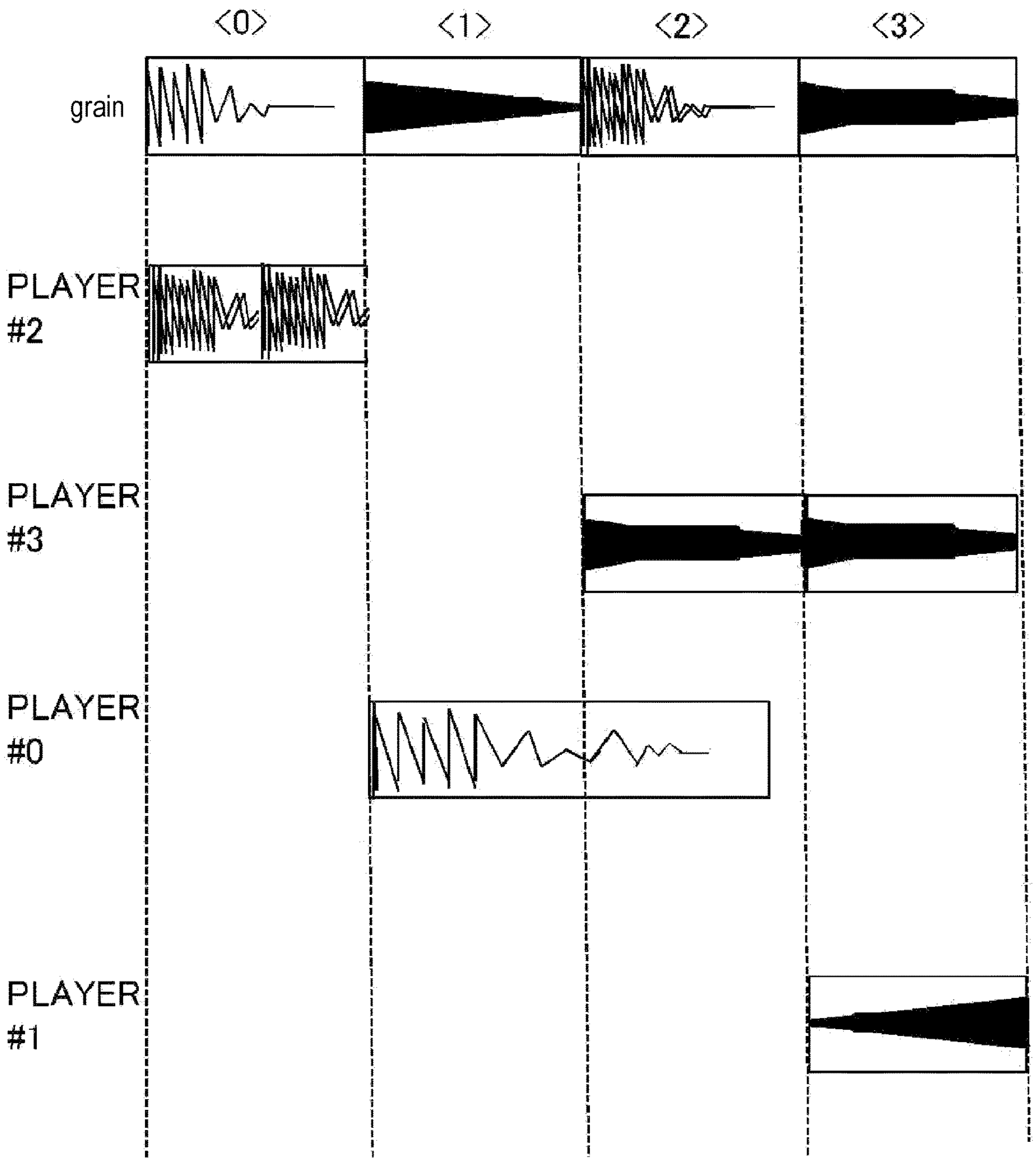
FIG. 8 shows an example of reproduction control (step sequence) using a button group and a pad group.

FIG. 8 shows an example of reproduction control (step sequence) using the button group 23 and the pad group 24. FIG. 8 shows an example in which the reproduction order of the grains <0> to <3> is set in the order of <2>, <0>, <3>, and <1> and a change in the reproduction speed, the reverse reproduction, the retrigger, and the hold are adopted as the reproduction modes of the grains <0> to <3>. By reproduction based on the step sequence, it is possible to acquire musical sound material of complicated sounds with a simple operation.

In the above example, there is no change in a correspondence relationship between the reproduction control parts and the grains before and after the reproduction order is set. In contrast, the plurality of reproduction control parts 104 may be used in ascending order of numbers with respect to the reproduction order.

<Reproduction Mode Change During Reproduction (Real-time Change in Reproduction Mode)>

With respect to the musical sound stored in the waveform memory 103, for example, when a reproduction process based on the above step sequence is repeatedly performed, if any one of the pads forming the pad group 24 is pressed, a reproduction mode for the pressed pad is applied to the reproduction of grains. The reproduction mode is changed only while the pressure on the pad is maintained, and when the pressure on the pad is released, the reproduction mode returns to the original state.

When a plurality of pads is pressed in order, an order in which the pads are pressed is stored, and a reproduction mode of the finally pressed pad is applied. Thereafter, each time the pressure on the pad is released, the reproduction mode is changed, and when the pressure on all the pads is released, the reproduction mode returns to the original state.

(A) of FIG. 9 shows FIFO that stores pad event information and (B) of FIG. 9 shows a link list of pads corresponding to pad events. The FIFO is formed using, for example, the SDRAM included in the storage device 14. However, other storage media may be used.

The pad event information includes pad identification information (pad number) on event occurrence, and information (event value) indicating an event that has occurred. The event value indicates one of "pressing" indicating that a pad is pressed by a finger and the like and "separation" indicating that the finger and the like pressing the pad are separated from the pad. However, a pad in which the pad event information is registered in the FIFO is limited to a pad to which a reproduction mode is assigned.

(A) of FIG. 9 shows the state of the FIFO when the pads are pressed in the order of the pad #0, the pad #1, and the pad #2 and then the pressure on the pad #1 is released. The FIFO stores pad event information indicating the pad number #0 and pressing, the pad number #1 and pressing, the pad number #2 and pressing, and the pad number #1 and separation.

Information is inputted to the FIFO by, for example, interrupt processing of the CPU 12. The CPU 12 monitors the states "pressing" and "separation" for each of the pads #0 to #15 forming the pad group 24, and when either the "pressing" or "separation" is detected, the CPU 12 registers pad event information including a pad number and an event in the FIFO (however, information may be registered in the FIFO by a component other than the CPU 12).

(B) of FIG. 9 schematically shows a link list that stores information indicating an order in which the pads are pressed (order in which the pads are returned to the original state). As described above, when the pads are pressed in the order of the pad #0, the pad #1, and the pad #2, the link list stores information in which the pad #1 is linked after the pad #0 and the pad #2 is linked after the pad #1. Thereafter, when the pressure on the pad #1 is released, information of the pad #1 is deleted from the link list and the pad #2 is correlated after the pad #0. When all the pads are in the state "separation", the link list is in a state "no data".

FIG. 10 is a flowchart showing an example of a pad event process. The process of FIG. 10 shows a process for one pad event information read from the FIFO, and when a plurality of pad event information is registered in the FIFO, the process shown in FIG. 10 is performed in the order of registration. The process of FIG. 10 is performed by, for example, the CPU 12.

In S101, the CPU 12 extracts the oldest pad event information from the FIFO and acquires a pad number "X" included in the pad event information (S102). In S103, the CPU 12 refers to an event value of the pad event information and determines whether the event value is "pressing". When it is determined that the event value is "pressing", the CPU 12 adds the pad number "X" to the link list (S105) and ends the process of FIG. 10.

In contrast, when it is determined that the event value is not "pressing", the CPU 12 determines whether the event value is "separation" (S104). When it is determined that the event value is "separation", the CPU 12 deletes the pad number "X" from the link list and changes the linking before and after the deletion as necessary (S106). When the determination of S104 is NO and the process of S106 is ended, the CPU 12 ends the process of FIG. 10. By the process of FIG. 10, the link list is changed as shown in (B) of FIG. 9.

FIG. 11 is a flowchart showing an example of a reproduction mode change process based on the link list. The process of FIG. 11 is performed by the CPU 12 operating as a mode control part (however, may be performed by a component other than the CPU 12). The process of FIG. 11 is performed when the end of the link list is changed due to the aforementioned change in the link list.

In S201, the CPU 12 determines whether data (pad number) remains in the link list. The fact that the pad number remains indicates that one of the pads is in a pressed state, and the fact that no pad number remains indicates that the pressure on all the pads of the pad group 24 has been released.

When it is determined in S201 that the pad number remains, the CPU 12 acquires the pad number "X" at the end (finally pressed pad) in the link list. In S202, the CPU 12 sets the value of a variable i indicating the reproduction control part 104 to 0 (S203).

In S204, the CPU 12 determines whether a parameter set related to a reproduction mode has been saved, which has been set for the reproduction control part 104 (also referred to as the reproduction control part i) indicated by the variable i. When it is determined that the parameter set has not been saved, the CPU 12 saves the parameter set (S206) and proceeds to a process of S205. In contrast, when it is determined that the parameter set has been saved, the CPU 12 rewrites the parameter set, which has been set for the reproduction control part i, to a parameter set of a reproduction mode assigned to a pad with the pad number X (S205). Thereafter, the CPU 12 proceeds to a process of S207.

In S207, the CPU 12 changes the value of i to a value obtained by adding 1 to the current value of i (value indicating the next reproduction control part i) and proceeds to a process of S208. In S208, the CPU 12 determines whether the current value of i is larger than 15. When it is determined that the value of i is smaller than 15, the CPU 12 returns to the process of S204. When it is determined that the value of i is larger than 15, the CPU 12 ends the process of FIG. 11. When the value of i is larger than 15, it means that the processes of S204 to S207 have been performed for all the reproduction control parts 104. In this way, in the present embodiment, a reproduction mode corresponding to the pad number X is set for all the reproduction control parts 104.

Meanwhile, when it is determined in S201 that information indicating a pad being pressed has not been registered in the link list, that is, when it is determined that none of the pads is pressed, the CPU 12 proceeds to a process of S209. In S209, the CPU 12 sets the value of the variable i indicating the reproduction control part 104 to 0.

In S210, the CPU 12 determines whether there is a parameter set related to a reproduction mode, which has been saved for the reproduction control part i. When it is determined that there is no saved parameter set, the CPU 12 proceeds to a process of S212. In contrast, when it is determined that there is a saved parameter set, the CPU 12 writes back the parameter set, which has been set for the reproduction control part i, to the saved parameter set (S211). Thereafter, the CPU 12 proceeds to the process of S212.

In S212, the CPU 12 changes the value of i to a value obtained by adding 1 to the current value of i (value indicating the next reproduction control part i) and proceeds to a process of S213. In S213, the CPU 12 determines whether the current value of i is larger than 15. When it is determined that the value of i is smaller than 15, the CPU 12 returns to the process of S210. When it is determined that the value of i is larger than 15, the CPU 12 ends the process of FIG. 11.

As described above, according to the process of FIG. 11, when a pad to which a reproduction mode is assigned is pressed during the reproduction of a musical sound signal stored in the waveform memory 103, rewriting to a parameter set of the reproduction mode of the pressed pad is performed for all the reproduction control parts 104, and a corresponding grain is reproduced in the pad-compatible reproduction mode. Thereafter, when the pressure on the pad is released, the parameter set is written back to all the reproduction control parts 104, and the reproduction modes of the reproduction control parts 104 return to the original state.

The configurations described in the embodiment can be appropriately combined without departing from the purpose.

The invention claimed is:

1. A musical sound processing device comprising:

a storage part that stores musical sound waveform data;

a plurality of reproduction control parts, each of the plurality of reproduction control parts performs a reproduction process for reproducing a musical sound piece data, wherein an entirety of the musical sound waveform data is divided into a plurality of musical sound piece data, each of the plurality of reproduction control parts is configured to reproduce its respective musical sound piece data independently with a start timing, a reproduction end timing and a reproduction mode; and a mixer that mixes reproduction sounds to be output from the plurality of reproduction control parts as results of the reproduction processes.

2. The musical sound processing device according to claim 1, wherein the mixer generates musical sound data in which reproduction sounds output in parallel from two or more of the plurality of reproduction control parts are superimposed.

3. The musical sound processing device according to claim 1, wherein one of the plurality of reproduction control parts is formed by integrated circuits that are able to perform the reproduction processes that are respectively independent on the musical sound piece data.

4. The musical sound processing device according to claim 1, wherein the reproduction mode includes at least one of a change in a reproduction speed, reverse reproduction, repetitive reproduction, and a combination thereof with respect to the musical sound piece data.

5. The musical sound processing device according to claim 4, wherein each of the plurality of reproduction control parts changes the reproduction speed based on a predetermined coefficient by which a reproduction speed of the musical sound waveform data is to be multiplied.

6. The musical sound processing device according to claim 4, wherein each of the plurality of reproduction control parts performs the reverse reproduction based on information indicating a reproduction direction.

7. The musical sound processing device according to claim 4, wherein each of the plurality of reproduction control parts performs the repetitive reproduction based on information indicating a position where reproduction of the musical sound piece data is looped and information indicating the reproduction end timing.

8. The musical sound processing device according to claim 1, further comprising:

a plurality of first operating elements to which the musical sound piece data is assigned, respectively;

a plurality of second operating elements to each of which the reproduction mode is assigned, respectively; and a setting part that assigns musical sound piece data, which is selected by an operation of the plurality of first operating elements, to the plurality of reproduction control parts, and sets a reproduction mode selected by an operation of the plurality of second operating elements.

9. The musical sound processing device according to claim 8, wherein the plurality of first operating elements include a plurality of buttons that is arranged in series and to which the musical sound piece data is respectively assigned in order in the musical sound waveform data.

10. The musical sound processing device according to claim 8, wherein the plurality of second operating elements is a plurality of pads used for outputting musical instrument sounds.

11. The musical sound processing device according to claim 10, further comprising:

a mode control part that changes a reproduction mode of the reproduction control part to a reproduction mode, which is assigned to a first pad of a plurality of pads, while the first pad is pressed during reproduction of the musical sound piece data.

12. The musical sound processing device according to claim 11, wherein the mode control part saves information of an original reproduction mode when changing to the reproduction mode assigned to the first pad with respect to the reproduction control part, and performs a process for re-setting information of the original reproduction mode when a pressed state of the first pad is released.

13. A musical sound processing method comprising:

storing musical sound waveform data by a processor, dividing an entirety of the musical sound waveform data by the processor into a plurality of musical sound piece data;

performing reproduction processes by the processor for respectively reproducing each of the plurality of musical sound piece data with a reproduction start timing, a reproduction end timing and a reproduction mode; and outputting sound by the processor as results of the reproduction processes.

14. A musical sound processing method comprising:

storing musical sound waveform data by a processor;

dividing an entirety of the musical sound waveform data by the processor into a plurality of musical sound piece data;

performing reproduction processes by the processor for respectively reproducing each of the plurality of musical sound piece data with a reproduction start timing, a reproduction end timing and a reproduction mode; and mixing a plurality of reproduction sounds to be output by the processor as results of the reproduction processes.

15. The musical sound processing method according to claim 14, wherein mixing the plurality of reproduction sounds comprises generating musical sound data in which reproduction sounds output in parallel from two or more of the reproduction processes are superimposed.

16. The musical sound processing method according to claim 14, wherein the reproduction modes include at least one of a change in a reproduction speed, reverse reproduction, repetitive reproduction, and a combination thereof with respect to the musical sound piece data.

17. The musical sound processing method according to claim 16, wherein the reproduction processes comprise changing the reproduction speed based on a predetermined coefficient by which a reproduction speed of the musical sound waveform data is to be multiplied.

18. The musical sound processing method according to claim 16, wherein the reproduction processes comprise performing the reverse reproduction based on information indicating a reproduction direction.

19. The musical sound processing method according to claim 16, wherein the reproduction processes comprise performing the repetitive reproduction based on information indicating a position where reproduction of the musical sound piece data is looped and information indicating the reproduction end timing.

20. The musical sound processing method according to claim 14, comprising:

assigning the plurality of musical sound piece data to a plurality of first operating elements, respectively;

assigning the reproduction modes to a plurality of second operating elements, respectively; and assigning the plurality of musical sound piece data, which is selected from the plurality of first operating elements, and performing the reproduction processes in a reproduction mode selected from the plurality of second operating elements.

* * * * *